US007978922B2

(12) United States Patent
Rambharack et al.

(10) Patent No.: US 7,978,922 B2
(45) Date of Patent: Jul. 12, 2011

(54) COMPRESSING IMAGES IN DOCUMENTS

(75) Inventors: Jeffrey R. Rambharack, Santa Clara, CA (US); Bogdan R. Moldovan, Toronto (CA); Mark Jaremko, San Mateo, CA (US); Ryan C. Hill, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1192 days.

(21) Appl. No.: 11/303,153

(22) Filed: Dec. 15, 2005

(65) Prior Publication Data
US 2007/0140559 A1 Jun. 21, 2007

(51) Int. Cl.
G06K 9/36 (2006.01)
G06K 9/46 (2006.01)
(52) U.S. Cl. ....................................................... 382/239
(58) Field of Classification Search .................. None
See application file for complete search history.

(56) References Cited

U.S. PATENT DOCUMENTS

| | | | | | |
|---|---|---|---|---|---|
| 5,113,354 | A | * | 5/1992 | Harper et al. | 709/219 |
| 5,832,126 | A | * | 11/1998 | Tanaka | 382/239 |
| 5,991,515 | A | * | 11/1999 | Fall et al. | 358/1.15 |
| 6,424,742 | B2 | * | 7/2002 | Yamamoto et al. | 382/173 |
| 6,744,926 | B1 | * | 6/2004 | Nishigaki | 382/239 |
| 7,194,140 | B2 | * | 3/2007 | Ito et al. | 382/251 |
| 7,451,237 | B2 | * | 11/2008 | Takekawa et al. | 709/247 |
| 2003/0007695 | A1 | * | 1/2003 | Bossut et al. | 382/239 |
| 2004/0042671 | A1 | | 3/2004 | Westphal et al. | 382/232 |
| 2004/0161152 | A1 | * | 8/2004 | Marconi et al. | 382/190 |
| 2004/0218902 | A1 | * | 11/2004 | Yanagita | 386/52 |
| 2004/0258308 | A1 | * | 12/2004 | Sadovsky et al. | 382/190 |

FOREIGN PATENT DOCUMENTS

KR 10-0237851 1/2000

OTHER PUBLICATIONS

Said et al.; "Simplified Segmentation for Compound Image Compression"; 1999 IEEE; 1999 International Conference on Image Processing, Oct. 24-28, 1999 Kobe, Japan; 7 pgs.
Feng et al.; "Color Photo Categorization Using Compressed Histograms and Support Vector Machines"; 2003 International Conference on Image Processing; vol. III of III; Sep. 14-17, 2003 Barcelona, Spain; 6 pgs.
Office Action issued Feb. 12, 2010, in CN Application No. 200680047453.3, w/Translation.

* cited by examiner

*Primary Examiner* — Yuzhen Ge
(74) *Attorney, Agent, or Firm* — Merchant & Gould

(57) ABSTRACT

Images that are contained within documents are compressed to reduce the file size of the document. The compression may occur such that compression steps occur to the image automatically. The compression steps performed are determined based on the information available about the images in a document. The information is used to determine whether or not the image should be compressed as well as what compression method is used.

20 Claims, 8 Drawing Sheets

COMPRESSING IMAGES IN DOCUMENTS

BACKGROUND

Document file sizes may grow quickly with the addition of non-text elements. For example, an extensive use of images within the documents may cause the document to grow quickly. This problem is compounded by the increasing quality of images, particularly due to higher resolutions on digital cameras. In addition to storing the document on a hard drive, many documents may also be stored in other locations. For example, documents may be emailed to a group of users who each store their own copy of the document. While a user may manually compress an image within a document, this does not normally occur. Not only must users understand how to compress images they must also know how the compression will affect their image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Images that are contained within documents are compressed to reduce the file size of the document. The compression may occur such that compression steps occur to the images within the document automatically. The compression steps performed are determined based on the information available about the images in a document. The information is then used to determine whether or not the image should be compressed as well as what compression method is used.

DETAILED DESCRIPTION

Figure 1:
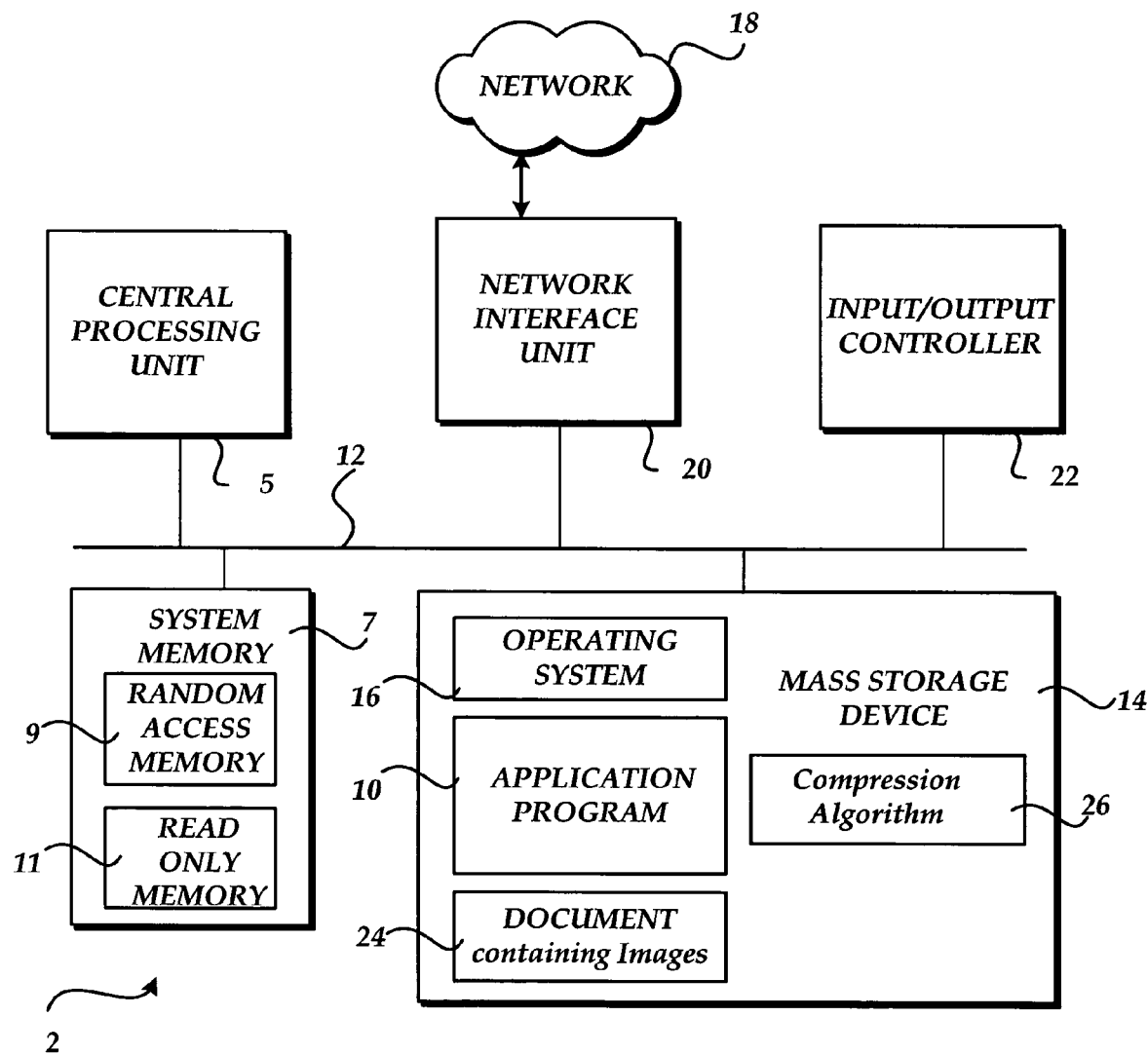
FIG. 1 illustrates an exemplary computing architecture for a computer.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments will be described. The computer architecture shown in FIG. 1 illustrates a desktop or mobile computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Washington. The mass storage device 14 and RAM 9 may also store one or more program modules. In particular, the mass storage device 14 and the RAM 9 may store an application program 10. The application program 10 is operative to provide functionality for creating and editing electronic documents, such as the document 24 that contains one or more images. According to one embodiment of the invention, the application program 10 comprises the MICROSOFT WORD word processing application program from MICROSOFT CORPORATION. According to another embodiment of the invention, the application program 10 comprises the MICROSOFT POWERPOINT application program from MICROSOFT CORPORATION. Other application programs from other manufacturers may also be utilized. For instance, desktop publishing programs, presentation programs, and any other type of program that includes images within their documents may be utilized.

The application program 10 may utilize a compression algorithm 26 to assist in compressing images within document 24. As will be described in greater detail below, the compression algorithm 26 may automatically compress images within document 24 such that the file size of the document is reduced.

Figure 2:
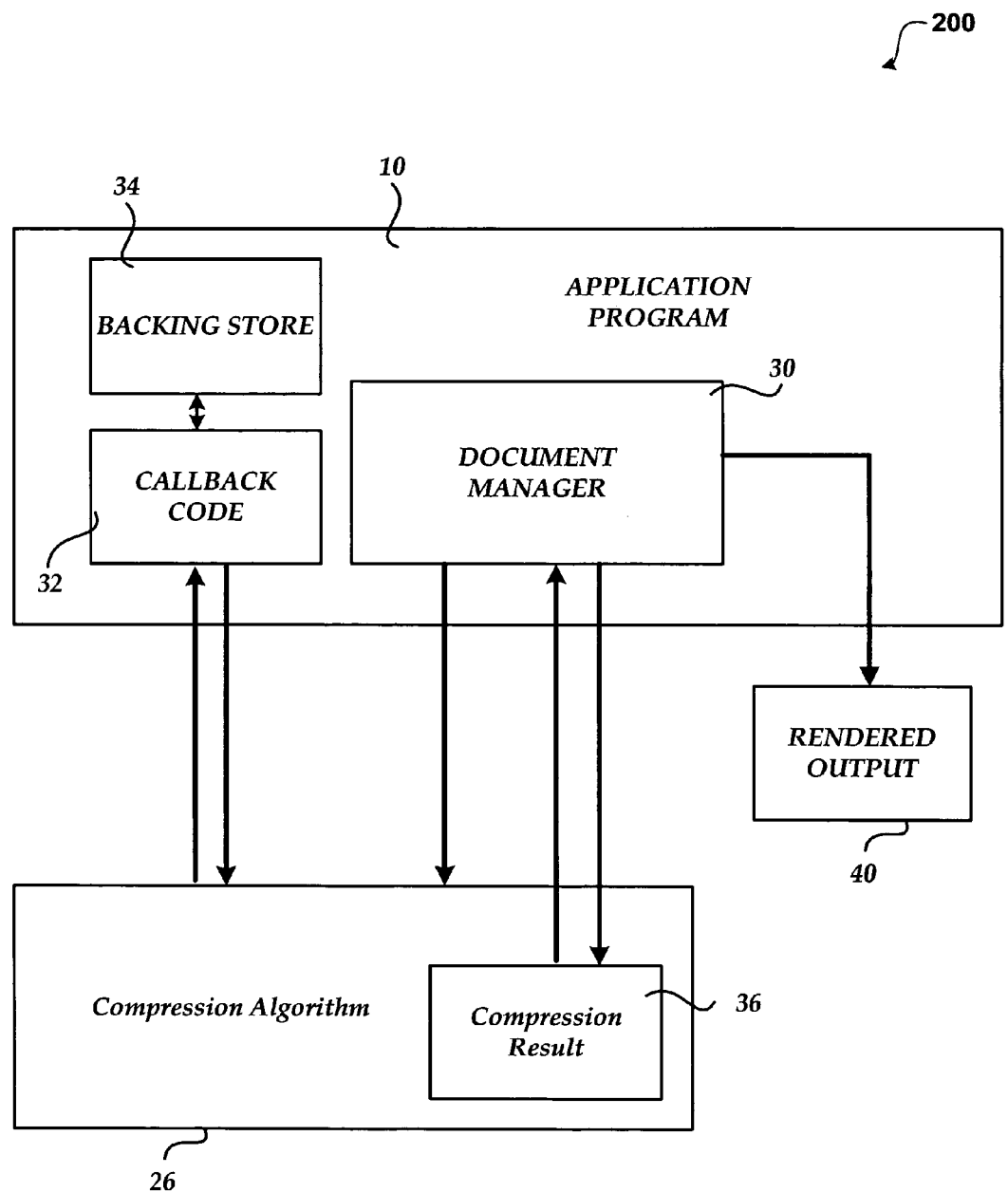
FIG. 2 illustrates an image compression system.

FIG. 2 illustrates an image compression system 200, in accordance with aspects of the invention. As described briefly above, the compression algorithm 26 provides compression services for application 10. According to one embodiment, the document may be stored in a backing store 34. In order to facilitate communication with the compression algorithm 26, one or more callback routines, illustrated in FIG. 2 as callback code 32 may be implemented. Through the use of the callback code 32, the compression algorithm 26 may query for additional information necessary to compress one or more of the images within the document.

The compression algorithm 26 provides automatic compression steps for compressing images within a document such that the file size of the document is reduced in size. The document manager 30 may provide to compression algorithm 26 the images and other content from the document that should be compressed and/or removed from the document. The compression algorithm 26 may utilize various parameters to assist in the compression process. For example, a resolution of an output device may be utilized to determine whether an image may be scaled. For example, a print resolution may be determined to be 220 ppi, whereas a screen/projector/web/email resolution may be set to somewhere around 72-192 ppi. Compression algorithm 26 may also determine whether an image has been cropped. When an image is cropped, the pixel information for the cropped area is usually stored by the application. When compressing the image, this information can be discarded to save space. The color depth may also be utilized. Color depth affects how an image can be compressed. Images with less than 256 colors or 16 gray levels are generally not good candidates for JPEG compression. However, images with excess color depth can be scaled down to reduce size. For example, if an image is saved externally in 24-bit color but only contains 8 colors, the excess color information can be stripped. Compression algorithm 26 may also strip any unnecessary data from the image. For example, images inserted into documents using copy/paste from an OLE client may consist of a small viewable image and a 24 bit uncompressed bitmap in the OLE stream. When compressing pictures, it is possible that this data can be discarded. Some of the data may not always be desirable to remove. For example, if the user inserts an image using Insert|Object then the OLE data cannot safely be discarded since the user explicitly requested to insert the image as an object. More details will be provided below.

Referring now to FIGS. 3 through 7, an illustrative process for compressing images within a document will be described. Although the embodiments described herein are presented in the context of a compression algorithm 26 and a word processing application program 10, other types of application programs that include images within their documents may be utilized. For instance, the embodiments described herein may be utilized within a presentation application program, a spreadsheet application program, a drawing or computer-aided design application program, and the like.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Figure 3:
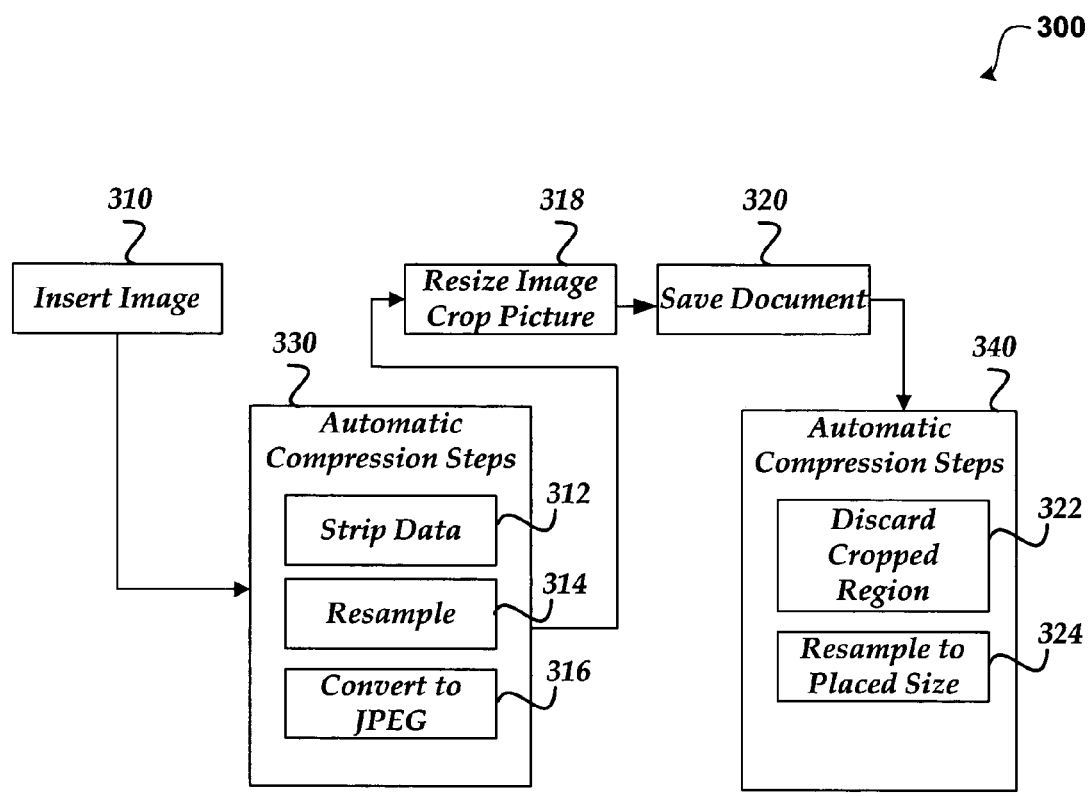
FIG. 3 shows an example scenario for automatically compressing images within document.

FIG. 3 shows an example scenario for automatically compressing images within documents. Any images that are contained within documents are candidates for compression in order to reduce the file size of the document. Images may be compressed using a variety of compression techniques, including, but not limited to: Discrete Cosine Transform (DCT) compression; Run Length encoding (RLE) compression; Lempel-Ziv (LZ) compression; and Lempel-Ziv-Welch (LZW) compression. For example, JPEG images may be compressed using DCT compression; GIF images may be compressed using LZW; bitmap images may be compressed using RLE; and PNG and TIFF may be compressed using LZ. Any compression algorithms may be used depending on the image type.

Scenario 300 illustrates a user inserting an image within one of their documents. The image inserted may include extraneous data. For example, the image may include an Object Linking and Embedding (OLE) stream that was copied with it when the image was inserted into the document. The document may also be a very high resolution document. In-response to inserting the image (310), automatic compression steps 330 may be performed to reduce the size of the image. For example, the image may be resampled (314) to decrease the resolution of the image. The OLE data may be stripped (312) from the image and the image may be converted (316) to another format when appropriate. For example, in this scenario the image would be much smaller if converted to JPEG. Suppose that once the image is in the document and the first set of automatic compression steps (330) have been performed the user decides to manipulate the image. For example, the user resized the image to be smaller and crops an unwanted region from the document (318). In response to saving the document (320), automatic compression steps 340 are performed to compress the image based on the resizing and the cropping. The image is resampled (324) according to its new size on the page and the cropped region is discarded from the image (322).

A user may also turn off the automatic compression steps. When the automatic compression feature is turned off in a document and the user sends their document to another user, the document maintains the automatic compression to be off.

Figure 4:
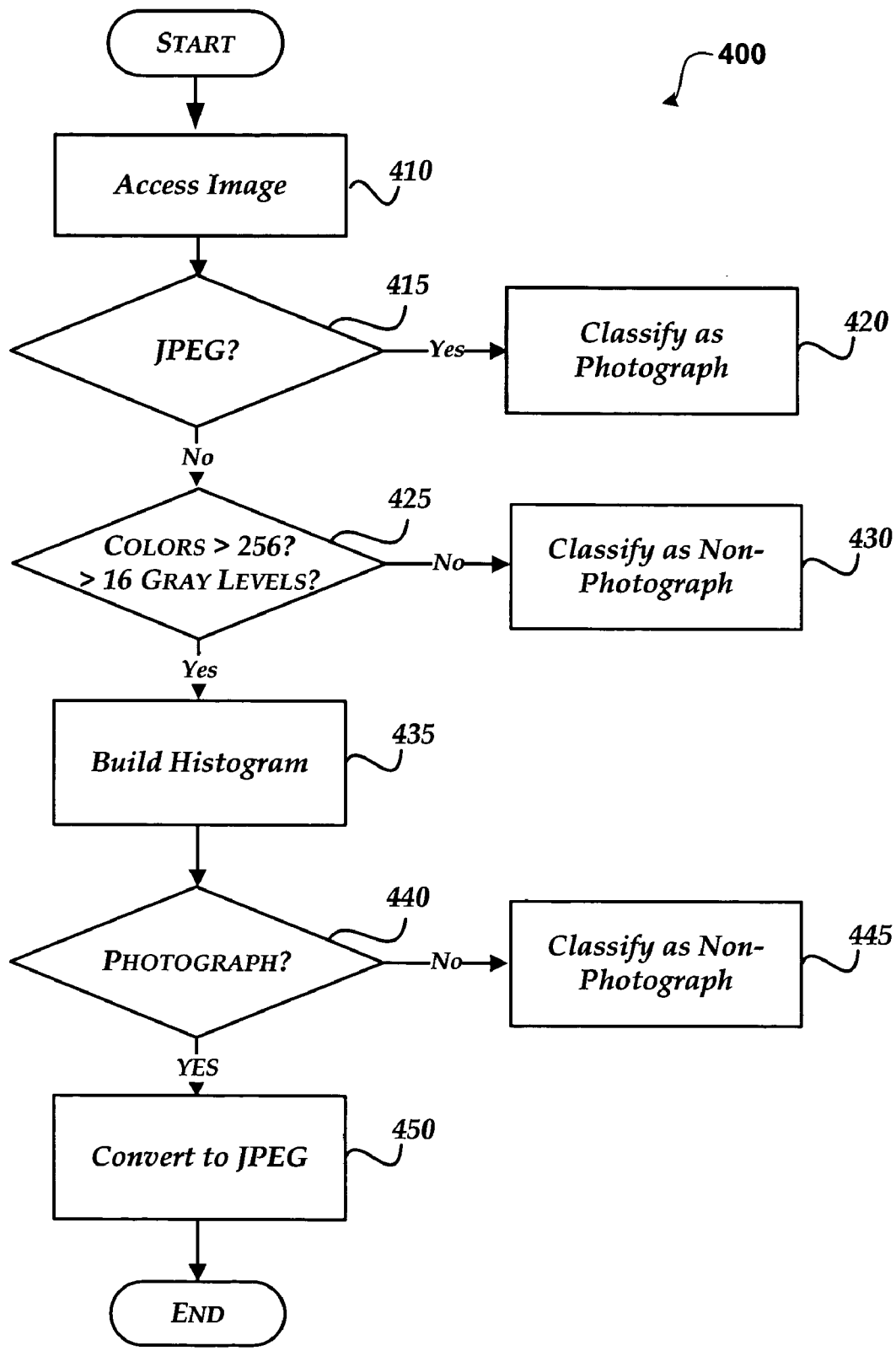
FIG. 4 illustrate a process for classifying an image.

FIG. 4 illustrate a process for classifying an image. The image stored within a document is classified as a photograph and a non-photograph. The classification of the image determines the compression steps to perform on the image.

After a start operation, the process moves to operation 410 where the image is accessed. Moving to decision operation 415, a determination is made as to whether the image is a JPEG image. When the image is a JPEG image, the process moves to operation 420 where the image is classified as a photograph. When the image is not a JPEG image the process flows to operation 425.

At decision operation 425 a determination is made as to whether the image contains more than 256 colors. The color depth affects how an image can be compressed. Images with less than 256 colors or 16 gray levels are generally not good candidates for JPEG compression. Images with excess color depth, however, can be scaled down to reduce size. For example, if an image is saved externally in 24-bit color but only contains 8 colors, the excess color information can be stripped from the image thereby reducing the file size.

When the image does not contain 256 colors or have 16 gray levels, the process flows to operation 430 where the image is classified as a non-photograph. When the image does contain more than 256 colors or 16 gray levels the process flows to operation 435.

Operation 435 builds a histogram of the image. Flowing to decision block 440 a determination is made based on the histogram results if the image should be classified as a photograph. Many different tests may be used to assist in determining whether the image is a photograph. Additionally, the parameters and thresholds associated with the histograms may be adjusted. In some situations, it may be found that adjusting the thresholds/parameters may provide better results. The following discussion presents three tests that may be used alone or in combination to determine whether the image is a photograph.

The first test determines the fraction of pixels in the top bins of the histogram. First, the image is resampled using a nearest neighbor interpolation such that the image is 640 pixels on its longest side. A three channel histogram is then performed to determine number of pixels in each color bin. The fraction of pixels in the 10 most common bins is calculated, and: if less than 20% of pixels are in the top 10 bins, then the image is a good candidate for JPEG compression and would be classified as a photograph.

A photograph classification score may be assigned from zero to one where the closer the value is to one the more likely the image will be classified as a photograph. The photograph classification score=1 if less than 20% of the pixels are in the top 10 bins, or (80—percentage in top bins)/60 if between 20 and 80; or the score is 0 if more than 80% of the pixels are in the top 10 bins.

A second test determines the number of histogram spikes. A spike is defined as a bin with more than 10 times as many pixels as its neighbor. The number of spikes is counted in the histogram. The fewer spikes there are indicates that the image is less likely to have artifacts if JPEG compressed and is likely to be classified as a photograph. The photograph classification score=1 when there are 0 or 1 spikes and decays when there are more spikes. For example, when there are 2 spikes the value could be 0.8, 4 spikes 0.6 and the like. These values may be experimented with to determine a desirable setting.

The third test determines the number of loaded bins. The number of 'loaded' bins is counted. A bin is considered loaded when it contains more than 10% of the total pixels. The fewer loaded bins there are, the better the JPEG compression would be and the more likely the image is a photograph. The photograph classification score=1 when there are no loaded bins and decays for more loaded bins.

The results of the tests may be combined to determine whether the image should be classified as a photograph. According to one embodiment, the following equation is used: Photograph classification score=0.7*Test1+ 0.05*Test2+0.25*Test.

If the photograph classification score>0.5 then the image is classified as a photograph and the image may be compressed.

Flowing to operation 450, the image is compressed. According to one embodiment, the compression is performed using JPEG compression. JPEG compression utilizes a quality setting that affects the JPEG compression and specifies the desired image quality. The quality setting is not directly proportional to the file size. According to one embodiment, a user may specify the desired image quality within prescribed constraints. Using prescribed constraints helps a user from excessively degrading the quality of an image. The relevant properties of the image quality parameter are listed below.

| Property | Value | Approximate File Size |
|---|---|---|
| Minimum Value | 0 | |
| Maximum Value (theoretical upper bound) | 100 | |
| Best quality in practice (no improvement in quality above this quality setting) | 95 | 5:1 |
| Lowest without noticeable loss of quality | 75 | 10:1 |
| Lowest without objectionable loss of quality | 50 | 20:1 |

A default quality setting is also provided. According to one embodiment, the JPEG quality setting is defaulted to 95.

The process then moves to an end block and returns to processing other actions.

Figure 5:
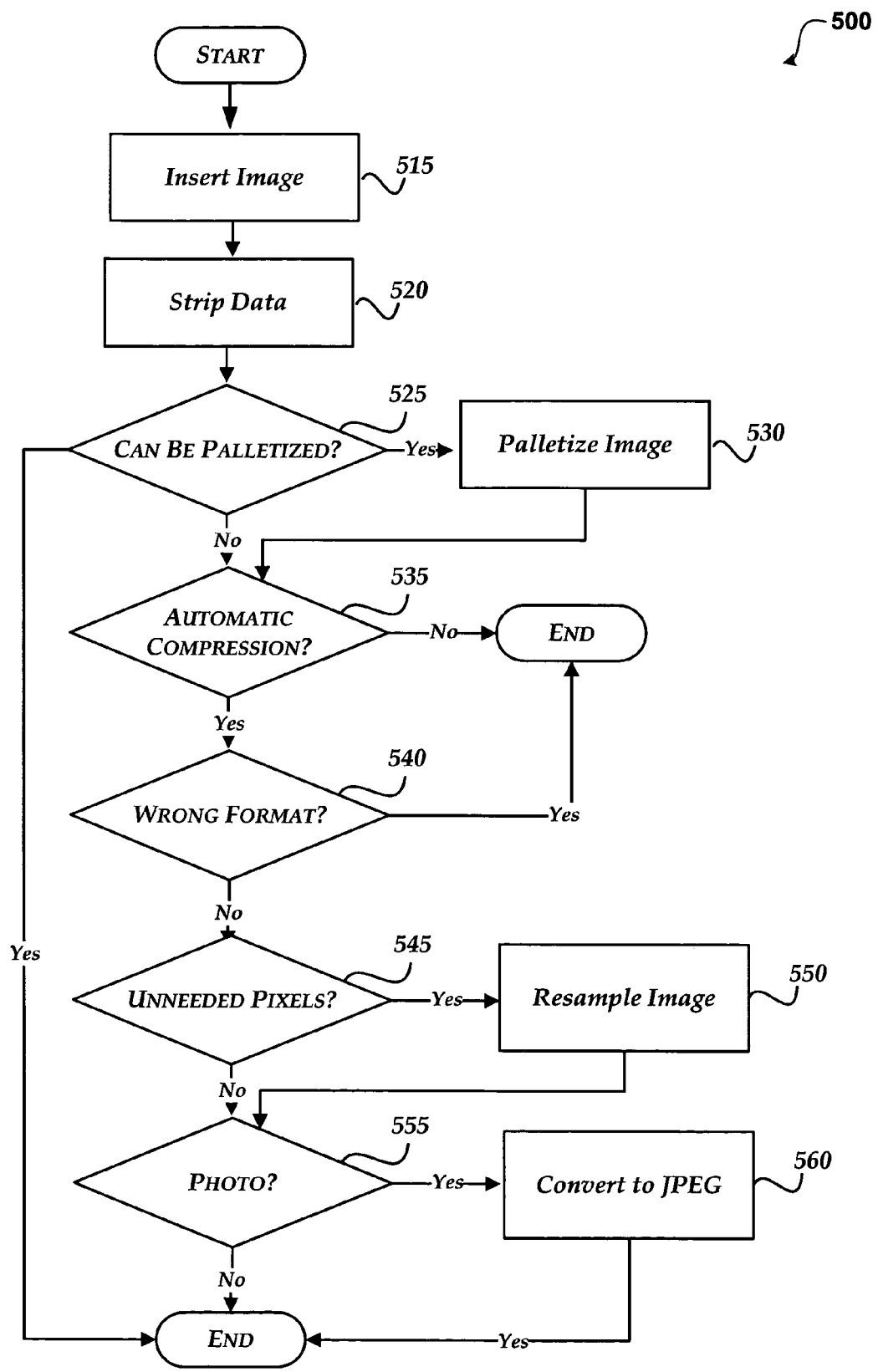
FIG. 5 shows a process for compressing an image upon an insert operation.

FIG. 5 shows a process for compressing an image upon an insert operation. After a start operation the process flows to operation 515, where an image is inserted within the document. The image may be inserted many different ways. For example, the image may be inserted from a file, sent from a device, pasted from another application, applying a picture fill to a shape and the like.

Transitioning to operation 520, any unnecessary data may be stripped from the image. For example, an image may include metadata that is not needed. According to one embodiment, unnecessary OLE data is stripped from the image.

Moving to decision operation 525, a determination is made as to whether the image can be palletized (the image has 8-bit or lower color depth). According to one embodiment, the images that can be palletized are stored in the PNG format with indexed color, except for GIF files, which are stored in the GIF format (530).

Flowing to decision operation 535, a determination is made as to whether automatic compression is turned on. When automatic compression is not turned on the process flows to an end operation. When automatic compression is turned on the process transitions to decision operation 540 where a determination is made as to whether the image is a wrong format. According to one embodiment, some image types are not compressed. For example, a GIF file may be considered a wrong format since GIF images are palletized and are therefore not good candidates for resampling. When the image is a wrong format, the process moves to an end operation. When the image is not a wrong format, the process flows to decision operation 545.

At decision operation 545 a determination is made as to whether or not the image has unneeded pixels. The unneeded pixel check determines if there are more than enough pixels to print to a desired device. The desired device could be a high resolution device or a low resolution device. According to one embodiment, the image includes the number of pixels needed to stretch the image to a full page size for the device. For example, if a user inserts a five megapixel image into an 8.5"×11" document then to fill the whole page at 220 ppi then the picture would need to have the following number of pixels: (8.5"×220 ppi)×(11"×220 ppi)=approx. 4.5 megapixels.

For a picture that has a different aspect ratio than the page, the image needs to retain enough pixels to fill the entire page. For example, if a picture is 3000 pixels wide by 2000 pixels tall and inserted into a landscape 8.5"×11" page, the picture could be resized to 2805×1870.

When there are not unneeded pixels, the process moves to operation 555. When there are unneeded pixels, the process moves to operation 550 where the picture is automatically resampled. The process then moves to decision operation 555.

At decision operation 555, a determination is made as to whether the image has been classified as a photo. Photographs are best compressed using JPEG compression but JPEG can introduce artifacts on non-photographic images. According to one embodiment, images that are not JPEG are converted to PNG by default (except for GIF files that stay as GIF). PNG compression, however, is inefficient for photographs. When the image has been classified as a photo, the process moves to operation 560 where the photo is converted to JPEG.

The process then moves to an end block and returns to processing other actions.

Figure 6:
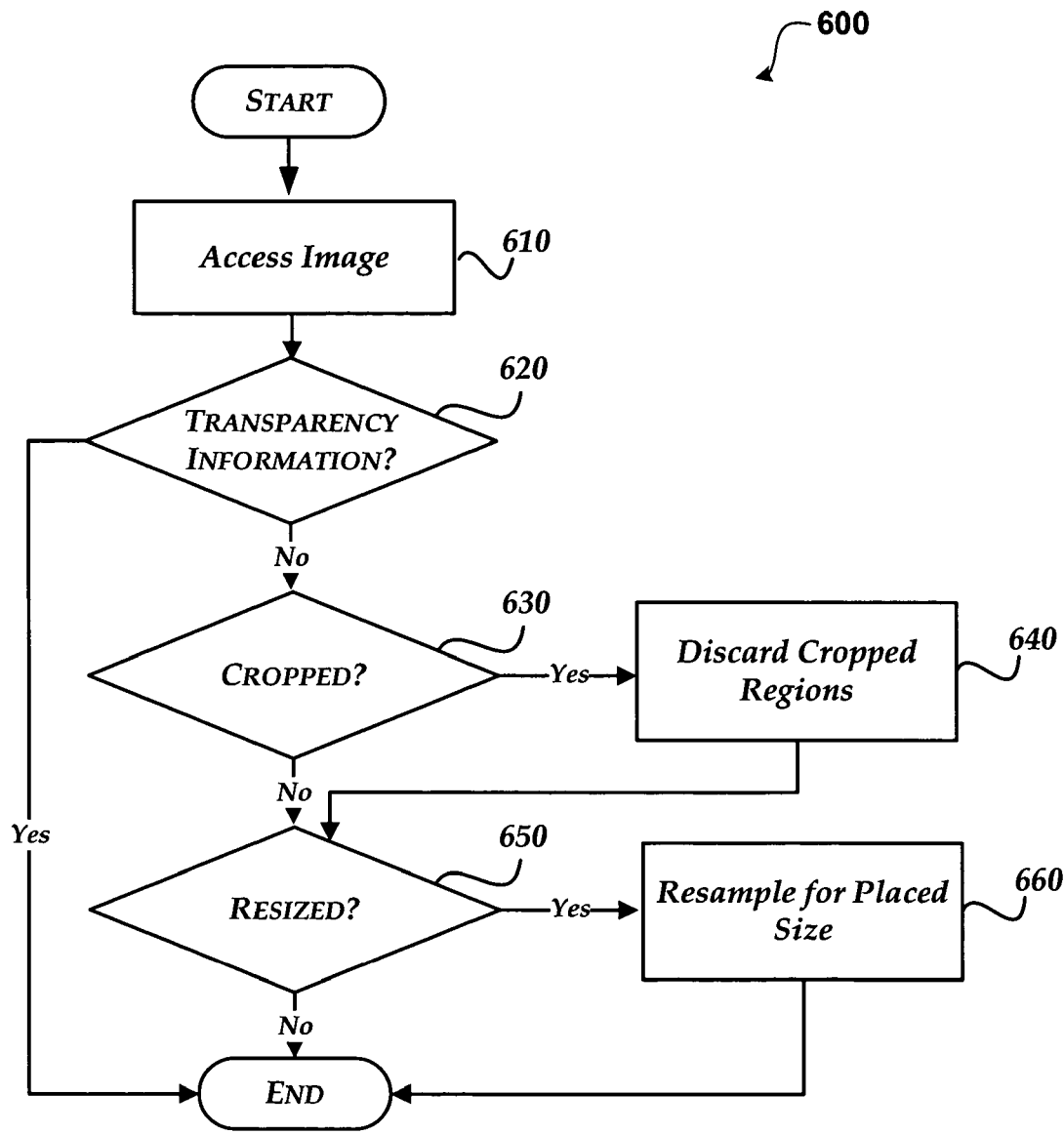
FIG. 6 shows a process for compression upon a save.

FIG. 6 shows a process for compression upon a save. After a start operation, the process flows to operation 610 where the image is accessed. Moving to decision operation 620, a determination is made as to whether the image contains transparency information. When an image has transparency information it may not be a good candidate for compression as the transparency information may be lost upon compression. Therefore, according to one embodiment, when the image includes transparency information the process flows to an end block. When the image does not include transparency information the process flows to decision operation 630.

Decision operation 630 determines whether the image has been cropped. According to one embodiment, when a crop operation is performed on the image, a 'dirty' flag is set on the image to show that it has been cropped. When the cropped regions are removed, the dirty flag is reset.

When the image has been cropped, the process flows to operation 640 where the cropped regions are discarded. When the image has not been cropped, the process flows to decision operation 650.

Decision operation 650 determines whether the image has been resized. Similarly to cropping operations, if resizing operations are performed on the image, a 'dirty' flag is set on the image to show that it has been modified. When the image is resampled, the dirty flag is reset.

When the image has been resized, the image is resampled (operation 660) to provide enough pixel resolution to print the image at high quality at its current size.

When the image has not been resized, the process flows to an end operation and returns to processing other actions.

Figure 7:
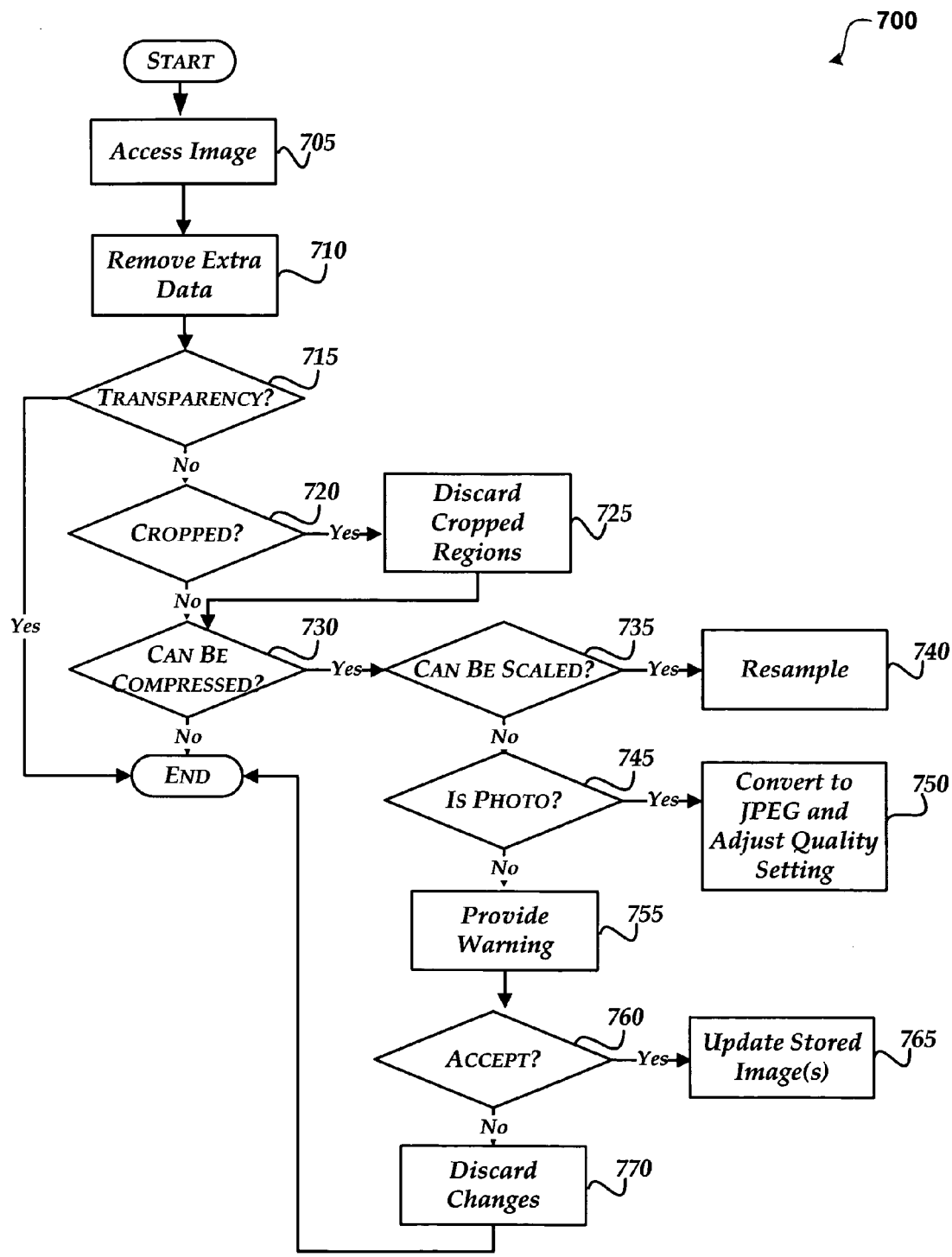
FIG. 7 illustrates a process for compression of images within a document when invoked by a user.

FIG. 7 illustrates a process for compression of images within a document when invoked by a user. Generally, the compression process when it is invoked by a user is a combination of the steps described above.

After a start operation, the process flows to operation 705 where an image in the document is accessed.

Moving to operation 710 any extra data is removed from the image. For example, the image may contain OLE data. According to one embodiment, when the user runs compress picture on selected objects, if the user chooses to strip the OLE data from a single image then the OLE stream is stripped. Alternatively, if the user runs compress pictures on all images in a document, the OLE stream is removed when it is considered safe to remove. A list of OLE types that are considered safe to remove may be stored within a list or in some other manner.

Moving to decision operation 715, a determination is made as to whether the image contains transparency information. When an image has transparency information it may not be a good candidate for compression as the transparency information may be lost upon compression. When the image does include transparency information the process flows to an end operation. When the image does not include transparency information the process flows to decision operation 720.

Decision operation 720 determines whether the image has been cropped. When the image has been cropped, the process flows to operation 725 where the cropped regions are discarded. When the image has not been cropped, the process flows to decision operation 730. According to one embodiment, the crop determination also considers the case where multiple images reference the same source and are cropped in different ways. In this case, the cropped information is discarded from the source when it is not needed by any of the instances in a document.

Decision operation 730 determines if the image can be compressed. If the images have already been compressed then the images that have been compressed are flagged and the target output mode is saved as a property of the image. Once an image has been compressed, the images are compressed again when the target output mode has been changed and requires a more aggressive compression. The target output mode property is then updated. According to one embodiment, images of a size that is less than 100 kb are not compressed. While 100 kb is used in one embodiment, this setting may be set as desired or ignored. When the image can not be compressed the process flows to an end block. When the image can be compressed, the process flows to operation 735.

Decision operation 735 determines whether the image can be scaled. An image may be scaled when it contains extra pixels as determined by the desired output device. For example, a printer may use a resolution of 220 ppi, whereas a screen/projector/web may use 150 ppi and an email may use 96 ppi. Different resolutions may be selected. When the image may be scaled, the process moves to operation 740 where the image is resampled. When the image may not be scaled the process moves to decision operation 745.

Decision operation 745 determines whether the image is a photo. When the image is classified as a photo, the process moves to operation 750 where the image is JPEG compressed at a determined quality setting. When the image is not classified as a photo, the process moves to operation 755 where a warning may be provided to the user. The warning may indicate that the image(s) is going to be compressed and would they like to accept the changes.

Transitioning to decision operation 760, a determination is made as to whether the user accepts the changes. When the user accepts the changes the process moves to operation 765 where the document is saved with the updated image(s). When the user does not accept the changes, the process flows to operation 770 where the changes are discarded.

The process then moves to an end operation and returns to processing other actions.

Figure 8:
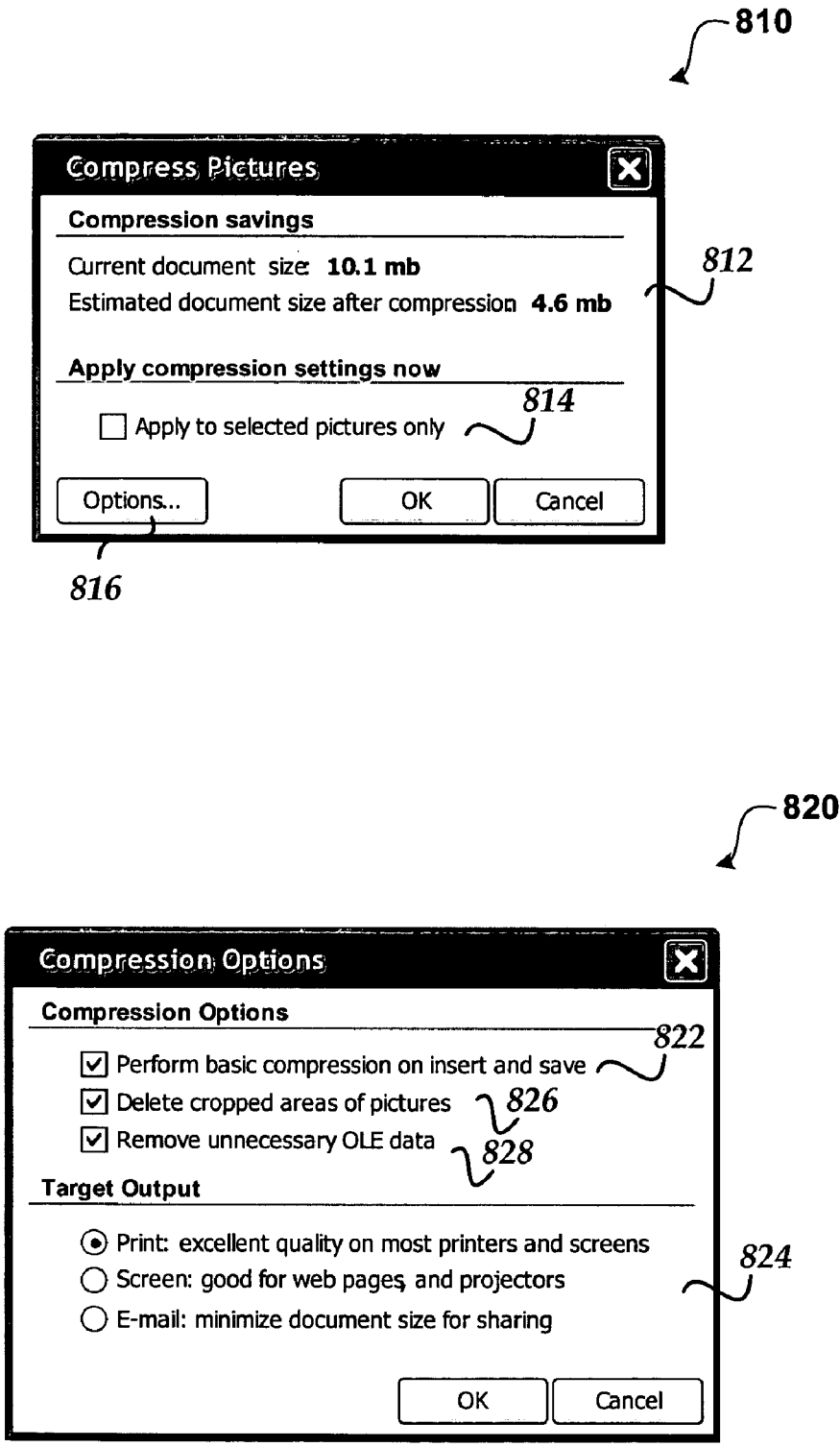
FIG. 8 illustrates exemplary compression dialogs, in accordance with aspects of the present invention.

FIG. 8 illustrates exemplary compression dialogs. Dialog 810 illustrates a compress pictures dialog and dialog 820 illustrates a compression options dialog.

The file size comparison (812) provides the user with an estimation of the space savings after the compression. Calculating the file size of the document with the images iterates through the images in the document using a separate thread.

While the file size is being generated, a message, such as "Processing . . . " is provided to the user.

The user can adjust the compression settings by selecting options button 816 and making any desired changes in dialog 820. The settings are maintained such that they are remembered when new documents are created.

An indication of the automatic compression option (822) is embedded in the document such that the setting persists when the file is shared with other users.

The target output mode 824 may also be stored. The delete cropped areas option 826 specifies whether cropped regions of pictures are discarded. The remove unnecessary data option 828 specifies whether extra data is discarded The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for compressing images stored in a document, comprising:
    utilizing a processor on a computing device, accessing an image within the document; wherein the document includes other data in addition to the image;
    determining from the document whether an automatic compression feature is turned on;
    classifying the image;
    automatically determining a plurality of compression steps for the image to be applied at a first time;
    automatically applying the plurality of compression steps to the image at the first time;
    determining that the compressed image is manipulated after the plurality of compression steps are applied to the image at the first time by a user performing a resize operation such that the compressed image is resized;
    setting a flag indicating that the compressed image has been modified; and
    in response to saving the document checking the flag and performing an additional compression step of resampling the compressed image at a second time according to a new size of the resized compressed image when the flag indicates that the compressed image has been modified.

2. The computer-implemented method of claim 1, wherein classifying the image comprises classifying the image as at least one of: a photograph and a non-photograph.

3. The computer-implemented method of claim 1, further comprising determining when an image is inserted into the document and when the image is inserted automatically performing the following operations: stripping unnecessary data from the image; resampling the image; and converting the image to another format.

4. The computer-implemented method of claim 3, further comprising when the document is saved discarding a cropped region of the compressed image.

5. The computer-implemented method of claim 2, wherein classifying the image comprises building a histogram of the image.

6. The computer-implemented method of claim 2, wherein automatically determining the compression steps for the image comprises determining at least one of: whether the image may be palletized; whether the image is a wrong format; whether there are unneeded pixels; whether the image includes transparency information; whether the image has been cropped; and whether the image has been resized.

7. The computer-implemented method of claim 6, wherein determining whether the image has been cropped comprises determining cropped regions and discarding the cropped regions.

8. The computer-implemented method of claim 6, wherein determining whether the image has been resized comprises resampling the image.

9. The computer-implemented method of claim 6, wherein determining whether the image has unneeded pixels comprises determining a desired resolution and resampling the image based on the desired resolution.

10. A computer-readable storage memory storing computer-executable instructions for automatically compressing images stored in a document, the computer-executable instructions causing a computer to execute a method comprising:
    determining from the document whether an automatic compression feature is turned on;
    accessing an image within the document;
    classifying the image;
    automatically determining a first set of compression steps for the image;
    automatically applying the first set of compression steps to the image at a first time;
    setting a flag indicating that the image has been modified; and
    in response to saving the document and determining that the flag indicates that the compressed image has been modified automatically applying a second set of compression steps to the compressed image at a second time.

11. The computer-readable storage memory of claim 10, further comprising determining when an image is inserted into the document and when the image is inserted automatically performing removing unnecessary data from the image; resampling the image; and converting the image to a JPEG format.

12. The computer-readable storage memory of claim 11, further comprising determining when a document is saved and automatically discarding a cropped region of the compressed image.

13. The computer-readable storage memory of claim 10, wherein classifying the image comprises building a histogram of the image and using the histogram to determine whether the image is a photograph.

14. The computer-readable storage memory of claim 13, wherein determining whether the image is a photograph comprises performing at least one of the following tests based on the histogram: determining a fraction of pixels in top bins of the histogram; determining a number of histogram spikes; and determining a number of loaded bins.

15. The computer-readable storage memory of claim 10, wherein automatically determining the first set of compression steps and the second set of the compression steps for the image comprises performing at least two of: determining whether the image may be palletized; determining whether the image is a wrong format; determining whether there are unneeded pixels and when there are unneeded pixels resampling the image; determining whether the image includes transparency information; determining whether the image has been cropped and when the image has been cropped removing cropped regions; and determining whether the image has been resized and when the image has bee resized resampling the image.

16. A system for compressing images stored in a document, comprising:
    a processor and a computer-readable storage medium;
    an input device that is configured to receive input;

a document that includes an image;

an application configured to edit the document and that is configured to receive the input from the input device; and a compression algorithm that performs operations relating to the application and that is configured to automatically compress the image when determined; wherein the algorithm is configured to perform actions using the processor, comprising;

determining from the document whether an automatic compression feature is turned on;

accessing the image within the document;

classifying the image as one of: a photograph and a non-photograph;

automatically determining a first set of compression steps for the image;

applying the first set of compression steps to the image at a first time before a save of the document;

setting a flag indicating that the image has been modified; and in response to saving the document determining when the flag indicates that the compressed image has been modified and automatically applying a second set of compression steps to the compressed image at a second time.

17. The system of claim 16, wherein automatically compressing the image when determined comprises determining whether an image is inserted into the document.

18. The system of claim 17, wherein determining whether the image is inserted into the document comprises automatically performing at least one of the following operations: stripping unnecessary data from the image; resampling the image; converting the image to another format; discarding a cropped region of the image; and resampling the image based on a placed size.

19. The system of claim 18, wherein classifying the image comprises building a histogram of the image and analyzing the histogram to determine pixel disbursement.

20. The system of claim 18, wherein automatically determining the first set of compression steps for the image comprises determining: whether the image may be palletized; whether the image is a wrong format; whether there are unneeded pixels; and whether the image includes transparency information.

* * * * *